May 16, 1933.  R. F. SMITH  1,909,229
METHOD OF WELDING METALLIC STRUCTURES
Filed Dec. 29, 1930  2 Sheets-Sheet 2
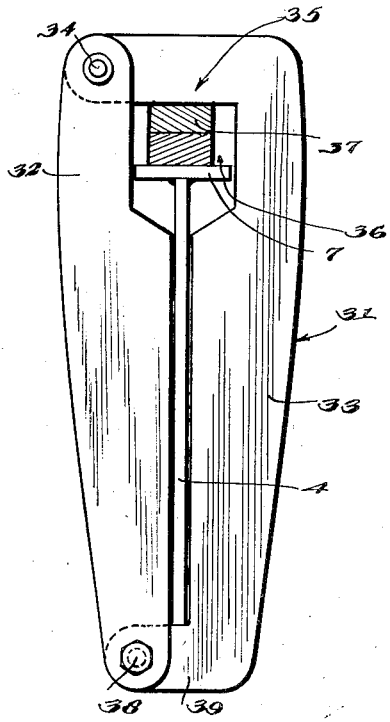
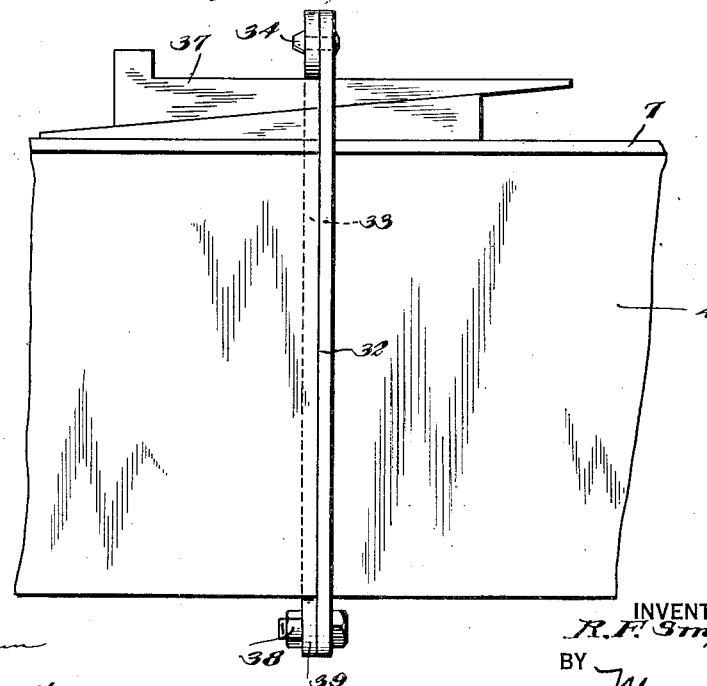
WITNESSES
INVENTOR
R. F. Smith,
BY
ATTORNEY Patented May 16, 1933

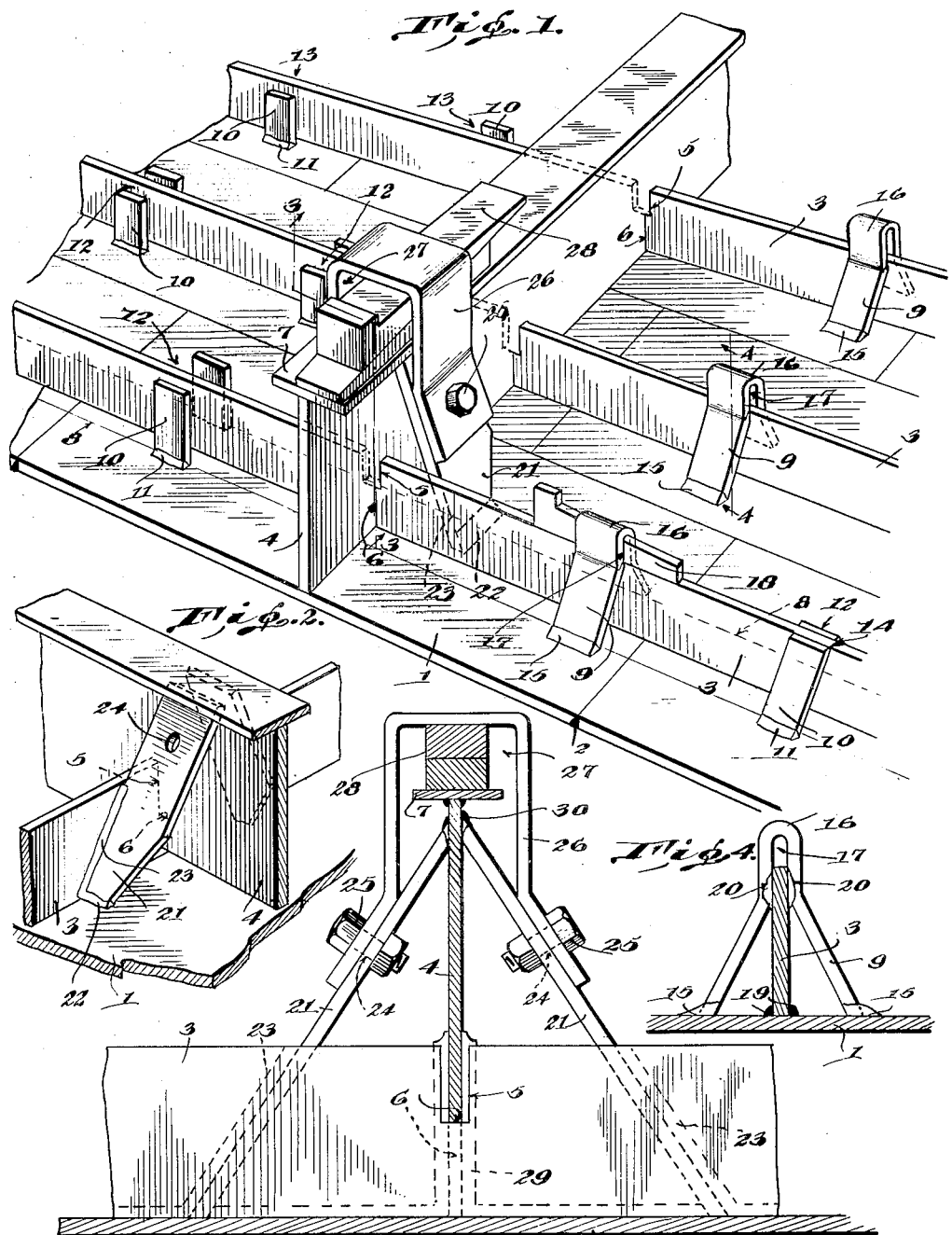

1,909,229

UNITED STATES PATENT OFFICE

RICHARD F. SMITH, OF NEW YORK, N. Y., ASSIGNOR OF ONE-FOURTH TO RAYMOND D. SULLIVAN, OF SAVANNAH, GEORGIA, ONE-HALF TO CHARLESTON DRY DOCK AND MACHINE COMPANY, OF CHARLESTON, SOUTH CAROLINA, A CORPORATION OF DELAWARE, AND ONE-FOURTH TO CHARLES V. BOYKIN AND SAMUEL A. GUILDS, BOTH OF CHARLESTON, SOUTH CAROLINA

METHOD OF WELDING METALLIC STRUCTURES

Application filed December 29, 1930. Serial No. 505,413.

This invention relates to improvements in metallic structures, the type herein chosen for illustration being that of a boat, and it consists of the constructions, combinations and arrangements herein described and claimed.

An object of the invention is to provide a metallic structure in the assemblage and erection of which use is made of a novel form of accessory which initially is made to act in the capacity of a tool for pressing certain structural components together preparatory to welding the joints, parts of which accessory are welded onto said components to ultimately form part of the complete structure.

Another object of the invention is to embody the foregoing principles in the making of a so-called welded boat, in other words, in the making of a boat where all joints, seams and the like are welded.

A further object of the invention is to carry out certain novel steps of a method of making a metallic structure, principal among which are the placing together of the structural components, welding on part of a tool or accessory in the preliminary assemblage, using that part as a base against which the rest of the tool operates to press the components together, welding the first part of the tool in a final position against said components to become integral with the metallic structure, then removing the active part of the tool for reuse at another point.

Other objects and advantages will appear in the following specification, reference being had to the accompanying drawings, in which Figure 1 is a perspective view of a part of a metallic structure showing the use of the welding accessory.

Figure 2 is a detail perspective view showing how one part of the accessory is preliminarily welded in place before its companion parts are applied.

Figure 3 is a cross section taken on the line 3—3 of Figure 1.

Figure 4 is a cross section taken on the line 4—4 of Figure 1.

Figure 5 is a view illustrating a type of clamp used in the preliminary work of making one of the structural components.

Figure 6 is a fractional elevation of said component showing the clamp in place.

The welding accessory, herein thus generally denoted as relating both to the structural features and principles of the tool, is of broad application, being capable of employment wherever it is necessary to press two components of a metal structure together prior to making a welded joint. According to the illustration given in this description the welding accessory is used in the making of a boat.

A novel feature of the accessory is that a part of it is incorporated in the metallic structure. In other words, that part is welded down in order to form a base upon which the rest of the tool operates in pressing the structural components together. When these components have been welded at the joint, the rest of the tool is taken away and used at another place for the same purpose.

Figure 1 illustrates what must be understood as being part of a scow. The bottom 1 consists of a large sheet made up of plates, butt-jointed and welded together as at 2. This sheet is stiffened by a plurality of bars 3 extending lengthwise of the scow and herein known as longitudinals. It is also stiffened by a plurality of web frames 4 which extend crosswise of the scow and are herein known as transverses. Only one of these is shown in the drawings, but in practice there would be six or seven at spaced intervals in a scow of moderate size.

Wherever a longitudinal 3 crosses a transverse 4 the two components are notched at 5, 6 to provide an interlock, or lock notch as it is more familiarly known in practice. The lower edges of these components are set upon the bottom 1, but inasmuch as the bottom tends toward waves or undulations because of its large size, the problem is to draw up the bottom against the longitudinals 3 and transverses 4 or, what is the same thing, to press these down against the bottom prior to welding the joint.

It is to be observed that the longitudinal 3 is not as tall as the transverse 4, the latter is naturally larger and heavier because of the strengthening function depending on it. The longitudinal 3 is nothing more than a cross sectionally rectangular bar, whereas the transverse 4 includes a flange 7 that gives it a T-shape in cross section (Fig. 2).

The longitudinal 3 is put down first, and preparatory to this two parallel lines 8 (Fig. 1) are chalked on the plating 1. These lines are used as guides for the setting of both clips 9 (Fig. 1) and brace plates 10. The latter can be welded down at 11 in series along the lines 8 either in pairs as denoted at 12, or in staggered relationship as denoted at 13.

Ordinarily these brace plates 10 stand up straight (see 12, Fig. 1) but ultimately are hammered or otherwise bent over until the top edges meet the previously positioned longitudinal 3, whereupon they are welded in position at 14. But before these brace plates are thus welded at 14 the clip 9 comes into play to press the longitudinal down against the bottom plating 1.

To this end the clip 9, which roughly has the shape of an inverted V, is stood over the longitudinal and welded down at its ends along the chalk line 8 as at 15. These welds connect the clip 9 with the bottom plate 1 permanently. The end closure 16 of the clip 9 extends an appreciable distance above the top edge of the longitudinal 3 (Fig. 4) to leave a space 17 for the operation of a pressure member in this instance comprising an inserted wedge 18. When the head of the wedge is hammered on it is easy to see that the reactions will drive the longitudinal 3 tightly against the bottom plating 1, whereupon welds 19 (Fig. 4) are applied along the joint.

Welds 20 are also applied to parts of the end closure or head 16 and the adjoining surfaces of the longitudinal 3 so as to rigidly combine the clip 9 as an inseparable part of the metallic structure. The wedge 18 is then knocked out, and the protruding end closure or head 16 may either be left or sawed off as might be preferred.

Usually quite a number of adjacent brace plates 10 can be welded in place at 14 with the drawing up action of one wedge 18. In other words, as many brace plates 10 will be welded in position as possible with one clip 9 and wedge 18. Therefore units 9, 18 will be used only at such intervals along the longitudinal 3 as will bring the drawing up effect of one within range of the other.

Thus it will be understood that the unit 9, 18 constitutes a welding accessory, a portion of which is welded to and forms part of the ultimate structure, the remaining portion being removed for reuse under a similar circumstance elsewhere. This principle is maintained in the putting down of the transverse 4. This, being both heavier than and different in construction from the longitudinal 3, requires a slightly different form of the welding accessory.

Clips 21 are welded down to the bottom plating 1 as at 22 and along the side of the adjoining longitudinal 3 as at 23 (Fig. 3). They are made to assume an inclined position to agree with the general contour of the clip 9. The top edges are left separated so that the transverse 4 can be slipped down between.

Holes 24 (Fig. 2) near the tops of the clips 21 receive bolts 25 or the like (Fig. 3) in order to temporarily secure a yoke 26 which constitutes an equivalent for the former end closure or head 16 (Fig. 4). This yoke or end closure is of such a height as to leave a space 27 (Fig. 3) between its top extremity and the flange 7. A wedge 28 (or two wedges, if necessary) is driven into the space so as to pull up on the clips 21 and press down on the transverse 4.

Welds 29, 30 are then applied around the interlocking joint 5 and at the top ends of the clips (Fig. 3) so as to make a permanent embodiment of the clips 21 into the metallic structure. A driving out of the wedge 28 enables the removal of the bolts 25 and yoke 26, whereupon these parts will be used again in pressing down the transverse 4 elsewhere.

The principle of pressing two parts together preparatory to making a welded joint is originally adopted in making the transverse 4. A clamp 31 (Fig. 5) is used for the purpose. This consists of a pair of arms 32, 33 that are hinged together at 34 at one end that comprises a head 35. This head is formed so as to define an internal space 36 which not only accommodates the flange 7 but the wedge 37 (or pair of wedges).

A bolt 38, or its equivalent, secures the opposite ends of the arms 32, 33 when these have been placed in an embracing position around the web 4, the reach piece 39 of the arm 33 providing an abutment for the web 4, resisting the pressure exerted in that direction by operation of the wedge 37 against the head 35.

Although the specific tool of Figures 5 and 6 is used preliminarily to either welding accessory in Figure 1, and although no part of it is incorporated in the ultimate metallic structure, yet the principle of the welding accessory persists as is plainly evident by the use of the head 35. In all instances the closed head provides a place for the wedge to act against, thus to exercise pressure on a part immediately therebeneath.

It is intended that the description of the use of the welding accessory in the making of a boat shall not be construed as a limitation thereof because the welding accessory can be used in the erection of any metallic structure where a part of it can be incorporated in that structure, and the remaining part taken away.

From this it is apparent that the making of the boat involves a novel method. The principal steps of this method comprise, first, the positioning of the articles to be welded; second, the positioning and partial attachment of the welding accessory; third, the use of a pressure device in connection with the welding accessory for the purpose of exerting pressure on the article to be welded; fourth, the final welding of that part of the accessory intended to remain integrally with the structure; fifth, the removal of that part of the accessory which will be used again elsewhere. One of the outstanding features of this method is the permanent incorporation of part of the clamping device that initially aids in holding the metallic structure together.

While the construction and arrangement of the improved metallic structure is that of a generally preferred form, obviously modifications and changes may be made without departing from the spirit of the invention or the scope of the claims.

I claim:—

1. The herein described method of assembling a metallic ship structure including a framework welded to strakes of plating, consisting of arranging the frame members upon the strakes of plating, emplacing the ends of substantially inverted V-shaped pressure accessories upon the strakes of plating so that the bight portions of the accessories overlie the frame members and are spaced therefrom, welding the said ends of the pressure accessories to the strakes of plating so as to serve as fixed bases for pressure-exerting devices, inserting pressure-exerting devices between the bight portions and frame members and exerting pressure therewith to press the frame members and strakes of plating together, then welding the substantially inverted V-shaped accessories to the frame members near the bight portions, and then removing the pressure-exerting devices for reuse.

2. The method of assembling a metallic structure, including an article and a second article to be connected thereto by welding, consisting of emplacing a portion of a welding accessory against the said articles preparatory to making the connection so that the head of said welding accessory extends from said portion above the said second article, initially welding said portion to the first-mentioned article thus makng a fixed foundation for the head, inserting a reusable wedge between said head and the edge of the said second-mentioned article for pressing the articles together, and welding said portion to the said second-mentioned article prior to the removal of the reusable wedge to form a brace for the second-mentioned article.

3. The method of assembling a metallic structure, including an article and a second article to be connected thereto by welding, consisting of emplacing a clip against the said articles so that the head thereof overlies said second article and is spaced therefrom, driving a wedge between the said head and the said second article to press the articles together, and welding said clip to the first-mentioned article and the second-mentioned article respectively before and after the insertion of the wedge, to form a brace for the said second-mentioned article.

4. The method of assembling a metallic structure, including an article and a second article to be connected thereto by welding, consisting of welding brace plates at their ends to the said second-mentioned article, using a welding accessory to press the articles together prior to welding the opposite ends of said brace plates to said second-mentioned article, inserting a wedge between the head of said welding accessory and the said second-mentioned article, welding said accessory to the said first-mentioned article and second-mentioned article respectively before and after the insertion of the wedge, and welding the opposite ends of said brace plates to said second-mentioned article after the articles have been pressed together, to form oppositely-arranged braces for said second-mentioned article.

RICHARD F. SMITH.